United States Patent
Herron et al.

(10) Patent No.: US 6,263,701 B1
(45) Date of Patent: Jul. 24, 2001

(54) PROCESS FOR THE PURIFICATION OF A MAJOR COMPONENT CONTAINING LIGHT AND HEAVY IMPURITIES

(75) Inventors: Donn Michael Herron, Fogelsville; Rakesh Agrawal, Emmaus, both of PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/390,077

(22) Filed: Sep. 3, 1999

(51) Int. Cl.$^7$ .................................................. F25J 3/02
(52) U.S. Cl. ........................................................ 62/646
(58) Field of Search ...................................... 62/646, 924

(56) References Cited

U.S. PATENT DOCUMENTS

| | | |
|---|---|---|
| 4,460,396 | 7/1984 | Kaiser et al. . |
| 4,560,397 | 12/1985 | Cheung ..................................... 62/28 |
| 4,615,716 | 10/1986 | Cormier et al. ........................... 62/24 |
| 4,780,118 | 10/1988 | Cheung ..................................... 62/11 |
| 4,867,772 | 9/1989 | Eyre ......................................... 62/24 |
| 4,869,741 | 9/1989 | McGuinness et al. ................... 62/24 |
| 4,977,746 | 12/1990 | Grenier et al. ............................ 62/22 |
| 5,049,173 | 9/1991 | Cormier, Sr. et al. ................... 62/24 |
| 5,195,324 | 3/1993 | Cheung ..................................... 62/24 |
| 5,682,763 | 11/1997 | Agrawal et al. ........................ 62/643 |
| 5,722,259 | * 3/1998 | Sorensen et al. ....................... 62/646 |

FOREIGN PATENT DOCUMENTS

| | | |
|---|---|---|
| 0377354 | 7/1990 | (EP) . |
| 0239268 | 4/1993 | (EP) . |
| 0780147 | 6/1997 | (EP) . |

* cited by examiner

Primary Examiner—Corrine McDermott
Assistant Examiner—Malik N. Drake
(74) Attorney, Agent, or Firm—Willard Jones II (57) ABSTRACT

A process purifies and recovers a major component from a feed stream containing: the major component at a concentration of at least 90 mole %, at least one light component having a greater volatility than the volatility of the major component, and at least one heavy component having a lesser volatility than the volatility of the major component. The process uses a distillation system, wherein at least three streams are produced: the purified major component, a stream enriched in a light component, and a stream enriched in a heavy component. The distillation system includes a higher pressure column and a lower pressure column with thermal linking achieved by condensing at least some of the vapor from the higher pressure column in a reboiler-condenser which provides at least some of the boilup for the lower pressure column. The process is applicable to the purification and recovery of electronic-grade oxygen from a standard-grade oxygen supply.

10 Claims, 7 Drawing Sheets

PROCESS FOR THE PURIFICATION OF A MAJOR COMPONENT CONTAINING LIGHT AND HEAVY IMPURITIES

CROSS-REFERENCE TO RELATED APPLICATIONS

Not Applicable.

STATEMENT REGARDING FEDERALLY SPONSORED RESEARCH FOR DEVELOPMENT

Not Applicable.

BACKGROUND OF THE INVENTION

The present invention pertains to the field of distillation of fluid mixtures, and in particular to processes for the production of electronic-grade oxygen or other ultra-high purity fluids from a standard-grade supply.

Liquefied atmospheric gases are increasingly used in the electronics industry. Frequently, however, the time required to build a new, full-scale, gas plant is too long or the initial gas requirements of an electronics facility are much less than the ultimate capacity of such a gas plant. In these instances, there is a need for a small system which can convert locally available standard-grade liquid into electronic-grade liquid. Typically, standard-grade liquids contain quantities of light impurities and heavy impurities which are considered undesirable for electronics applications.

There are several prior art processes for the production of electronic-grade oxygen, often called ultra-high purity oxygen. Several processes are directed to producing the oxygen (and sometimes also nitrogen) by cryogenic distillation of air, not by purification of standard-grade oxygen. Examples include: U.S. Pat. Nos. 4,560,397; 4,615,716; 4,977,746; 5,049,173; and 5,195,324. Production of electronic-grade oxygen by direct separation from air can be efficient but requires a relatively long procurement and construction schedule.

Some processes aimed at the direct production of electronic-grade oxygen from standard-grade liquid oxygen also have been disclosed in the prior art. Examples include: U.S. Pat. Nos. 4,780,118; 4,867,772; 4,869,741 and 5,682,763.

U.S. Pat. No. 4,780,118 discloses a process which uses two columns configured in a direct sequence. The feedstock enters the first column, which rejects the light impurities, from the top. The bottom stream from the first column, which is light-lean and contains oxygen and heavy impurities, is passed to the second column, from which the desired oxygen product is recovered from the top. The first column is fitted with a reboiler, and the second column is fitted with a condenser.

U.S. Pat. No. 4,867,772 discloses a process which uses two columns configured in an indirect sequence. The feedstock enters the first column, which rejects the heavy impurities, from the bottom. The top stream from the first column, which is heavy-lean and contains oxygen and light impurities, is passed to the second column, from which the desired oxygen product is recovered from the bottom. The first column is fitted with a condenser, and the second column has both a reboiler and a condenser.

U.S. Pat. No. 4,869,741 discloses a process which uses two columns configured as a main column and a side stripper. Both columns operate at the same pressure. Use of a side stripper eliminates one condenser.

For energy efficiency, U.S. Pat. Nos. 4,780,118; 4,867,772; and 4,869,741 utilize a closed loop heat pump to operate the reboilers and condensers.

U.S. Pat. No. 5,682,763 discloses a number of distillation configurations, some of which have been described previously. The improvement disclosed by U.S. Pat. No. 5,682,763 is the use of an external process stream to drive the reboiler and condenser—thereby eliminating the compression equipment associated with the previous disclosures.

It is desired to have a more economical means of removing light impurities and heavy impurities from standard-grade supply.

It is further desired to have improved processes for the purification of oxygen to produce electronic-grade oxygen.

It is still further desired to have improved processes for the purification of other fluids.

It also is desired to have improved processes for the production of electronic-grade oxygen or other ultra-high purity fluids which processes overcome the difficulties and disadvantages of the prior art processes to provide better and more advantageous results.

BRIEF SUMMARY OF THE INVENTION

The present invention is a process for the production of electronic-grade oxygen or other ultra-high purity fluids from a standard-grade supply.

A first embodiment of the invention is a process for recovering a purified stream of a first component having a first volatility from a multicomponent fluid containing the first component in a concentration of at least 90 mole %, at least one lighter component having a volatility higher than the first volatility, and at least one heavier component having a volatility lower than the first volatility. The process uses a first distillation column operating at a first pressure and a second distillation column operating at a second pressure. The first and second distillation columns are thermally linked and each distillation column has a top, a bottom, and at least one distillation section between the top and the bottom. The process comprises multiple steps. The first step is to feed the multicomponent fluid to the first distillation column. The second step is to separate from the multicomponent fluid in the first distillation column substantially all of the at least one lighter component or substantially all of the at least one heavier component, thereby forming a mixture stream substantially free of the at least one lighter component or substantially free of the at least one heavier component. The third step is to withdraw the mixture from the first distillation column. The fourth step is to feed the mixture stream into the second distillation column. The fifth step is to remove from the second distillation column a first stream substantially pure in the first component. The sixth step is to remove from the second distillation column a second stream enriched in the at least one lighter component or in the at least one heavier component. The seventh step is to remove from the first distillation column a third stream enriched in the at least one lighter component or in the at least one heavier component, wherein the first volatility is between the volatility of the at least one component enriching the second stream and the volatility of the at least one component enriching the third stream.

For example, the first component may be oxygen. The at least one lighter component may be selected from the group consisting of nitrogen, carbon monoxide, helium, hydrogen and argon. The at least one heavier component may be selected from the group consisting of carbon dioxide, nitrogen oxides, and hydrocarbons, said hydrocarbons being selected from the group consisting of methane, ethane ethylene, propane, and propylene.

In a second embodiment, which includes the same multiple steps as the first embodiment, the first pressure is higher than the second pressure. The first and second distillation columns in the second embodiment are thermally linked by condensing at least a portion of a vapor stream from the top of the first distillation column by indirect heat exchange against at least a portion of a liquid in the bottom of the second distillation column.

In a third embodiment, which includes the same multiple steps as the first embodiment, the first pressure is lower than the second pressure. The first and second distillation columns in the third embodiment are thermally linked by condensing at least a portion of a vapor stream from the second distillation column by indirect heat exchange against at least a portion of a liquid in the bottom of the first distillation column.

A fourth embodiment of the invention is a process for producing an electronic-grade oxygen from standard-grade oxygen containing at least one light impurity and/or at least one heavy impurity. The process uses a first distillation column and a second distillation column. The first and second distillation columns each have a top and a bottom, and are thermally linked by condensing at least a portion of a vapor stream from the top of the second distillation column by indirect heat exchange against at least a portion of a liquid in the bottom of the first distillation column. The process comprises multiple steps. The first step is to feed a stream of a standard-grade oxygen to the first distillation column, said first distillation column operating at a first pressure. The second step is to separate from the stream of standard-grade oxygen in the first distillation column substantially all of the at least one light impurity, thereby forming a mixture stream substantially free of the at least one light impurity. The third step is to withdraw the mixture from the first distillation column. The fourth step is to feed the mixture stream into the second distillation column, said second distillation column operating at a second pressure higher than the first pressure. The fifth step is to remove from the second distillation column a first stream containing the electronic-grade oxygen. The sixth step is to remove from the second distillation column a second stream enriched in the at least one heavy impurity. The seventh step is to remove from the first distillation column a third stream enriched in the at least one light impurity.

A fifth embodiment of the invention is a process for producing an electronic-grade oxygen from standard-grade oxygen containing at least one light impurity and/or at least one heavy impurity. The process uses a first distillation column and a second distillation column. The first and second distillation columns each have a top and a bottom, and are thermally linked by condensing at least a portion of a vapor stream from the top of the second distillation column by indirect heat exchange against at least a portion of a liquid in the bottom of the first distillation column. The process comprises multiple steps. The first step is to feed a stream of the standard-grade oxygen into a first distillation column, said first distillation column operating at a first pressure. The second step is to separate from the stream of standard-grade oxygen in the first distillation column substantially all of the at least one heavy impurity, thereby forming a mixture stream substantially free of the at least one heavy impurity. The third step is to withdraw the mixture stream from the first distillation column. The fourth step is to feed the mixture stream into the second distillation column, said distillation column operating at a second pressure lower than the first pressure. The fifth step is to remove from the second distillation column a first stream containing the electronic-grade oxygen. The sixth step is to remove from the second distillation column a second stream enriched in the at least one light impurity. The seventh step is to remove from the first distillation column a third stream enriched in the at least one heavy impurity.

BRIEF DESCRIPTION OF THE DRAWINGS

The invention will be described by way of example with reference to the accompanying drawings in which.

DETAILED DESCRIPTION OF THE INVENTION

The present invention provides a low-cost and efficient process for the purification and recovery of a major component from a feed stream containing: the major component at a concentration of at least 90 mole %, at least one light component of greater volatility than the major component, and at least one heavy component of lesser volatility than the major component. The process uses a distillation system, wherein at least three streams are produced: the purified major component, a stream enriched in the light component, and a stream enriched in the heavy component. The distillation system includes a higher pressure column and a lower pressure column with thermal linking achieved by condensing at least some of the vapor from the higher pressure column in a reboiler-condenser which provides at least some of the boilup for the lower pressure column.

The present invention is applicable to the purification and recovery of electronic-grade oxygen from a standard-grade supply. For the purpose of the present invention, electronic-grade product is defined as one in which the impurity levels of the undesirable light and heavy components are required to be at or below parts-per-billion (ppb) levels. "Standard-grade" is defined as having a major component purity equal to or greater than 90 mole %. The term "purified" means that the concentrations of the light impurities and the heavy impurities have been reduced relative to the concentrations of those impurities in the feed stream. For oxygen, typical light impurities include: nitrogen and carbon monoxide; depending on the application, argon may or may not be considered a light impurity. Typical heavy impurities include: methane and other hydrocarbons, carbon dioxide, and nitrogen oxides.

Figure 1:
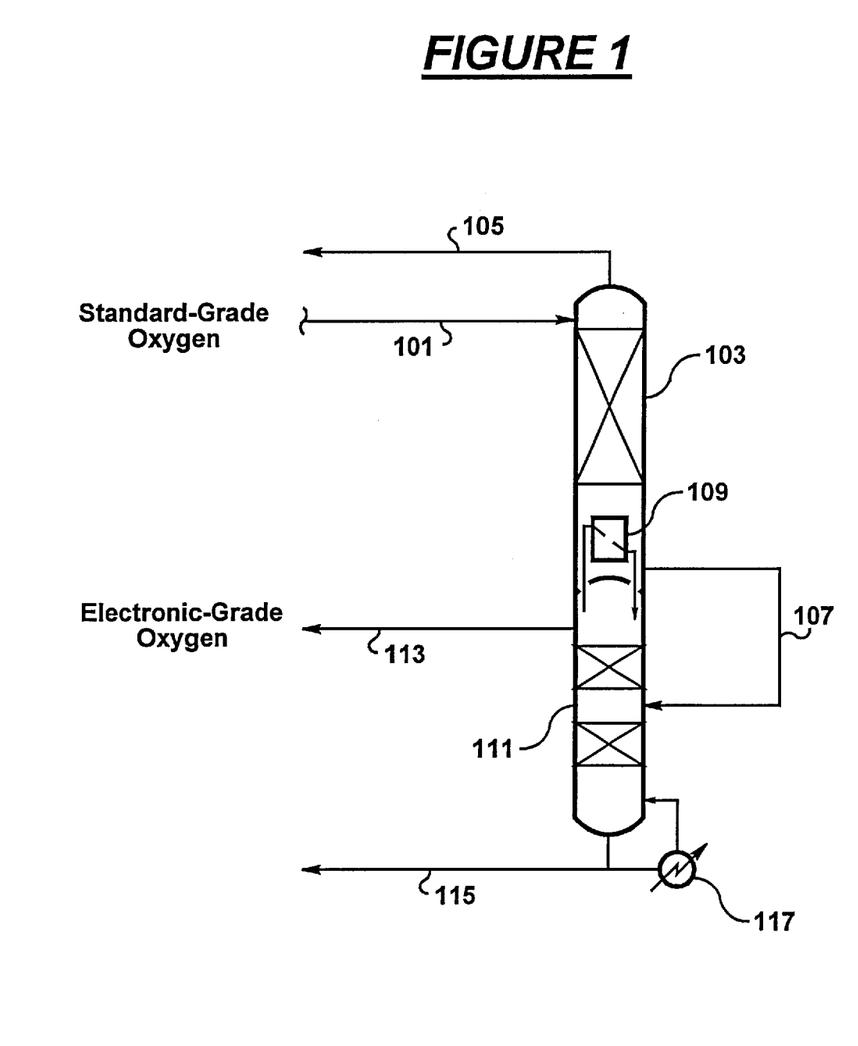
FIG. 1 is a schematic diagram of an embodiment of the present invention.

One embodiment of the present invention is shown in FIG. 1. Standard-grade liquid oxygen, having been suitably elevated in pressure, is introduced to the top of the lower pressure column 103 as liquid stream 101. The lower pressure column produces a stream 105 enriched in the light component and a stream 107 substantially free of the light component. Boilup for the lower pressure column is provided by reboiler-condenser 109. Stream 107 eventually is fed to the higher pressure column 111 as a feed. The higher pressure column produces a stream 115 enriched in the heavy component and a stream 113 substantially free of the heavy component, which stream constitutes the electronic-grade oxygen. Reflux for the higher pressure column is provided by reboiler-condenser 109; boilup for the higher pressure column is provided by heat exchanger 117. The heat removed to provide the reflux for the higher pressure column is thermally linked to the heat added to provide boilup in the lower pressure column through reboiler-condenser 109. Thus, the heat added to provide boilup for the higher pressure column through heat exchanger 117 is cascaded to provide boilup for the lower pressure column.

Stream 107 must be increased in pressure to be transferred from the lower pressure column 103 to the higher pressure column 111. If stream 107 is withdrawn from the lower pressure column as a vapor, it may be compressed before being introduced to the higher pressure column. If stream 107 is withdrawn as a liquid, it may be pumped to increase pressure, or in the preferred mode, its pressure may be increased through static head. Increasing pressure by static head is accomplished by ensuring that the bottom of the lower pressure column is physically elevated sufficiently higher than the point at which the feed to the higher pressure column is introduced. Typically, the pressure difference between the higher pressure column and the lower pressure column ranges between 3 psi and 10 psi, which requires that the elevation difference must be between 6 ft and 20 ft.

The electronic-grade oxygen product stream 113 may be withdrawn from the higher pressure column 111 either as a vapor or as a liquid. When withdrawn as a liquid, stream 113 may be sent to storage or sent directly to the user.

Boilup for the higher pressure column 111 may be provided by any suitable heat source through heat exchanger 117. Examples include but are not limited to: electric, steam, water, glycol, and warm air. Alternatively, heat may be provided by cooling a process stream associated with an adjacent cryogenic plant or other process.

To supplement operation, or for control purposes, reboiler-condenser 109 optionally may be assisted by including an additional reboiler in the lower pressure column 103 or an additional condenser in the higher pressure column 111.

Figure 2:
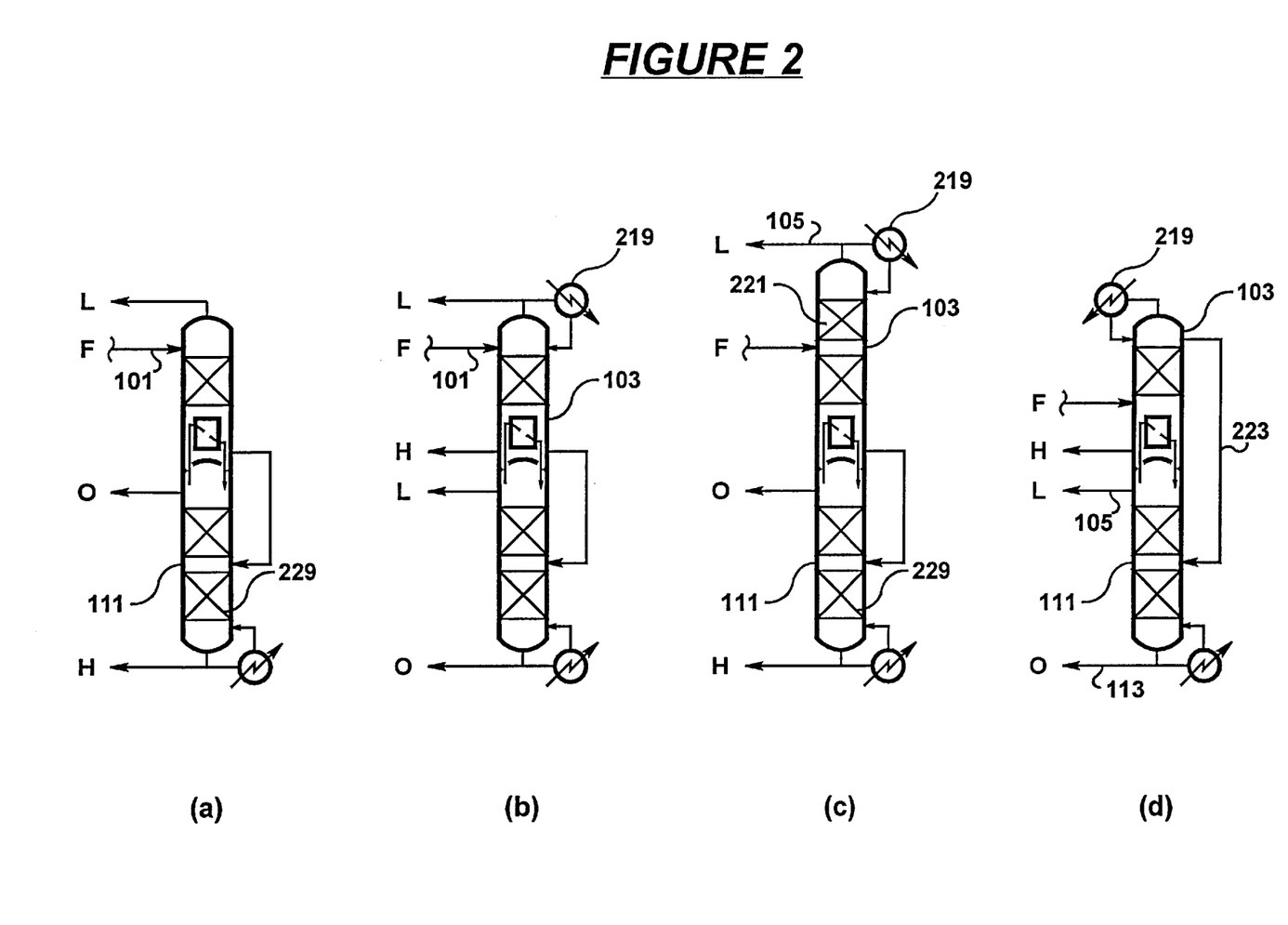
FIGS. 2(a) through 2(d) are schematic diagrams of four other embodiments of the present invention.
Figure 3:
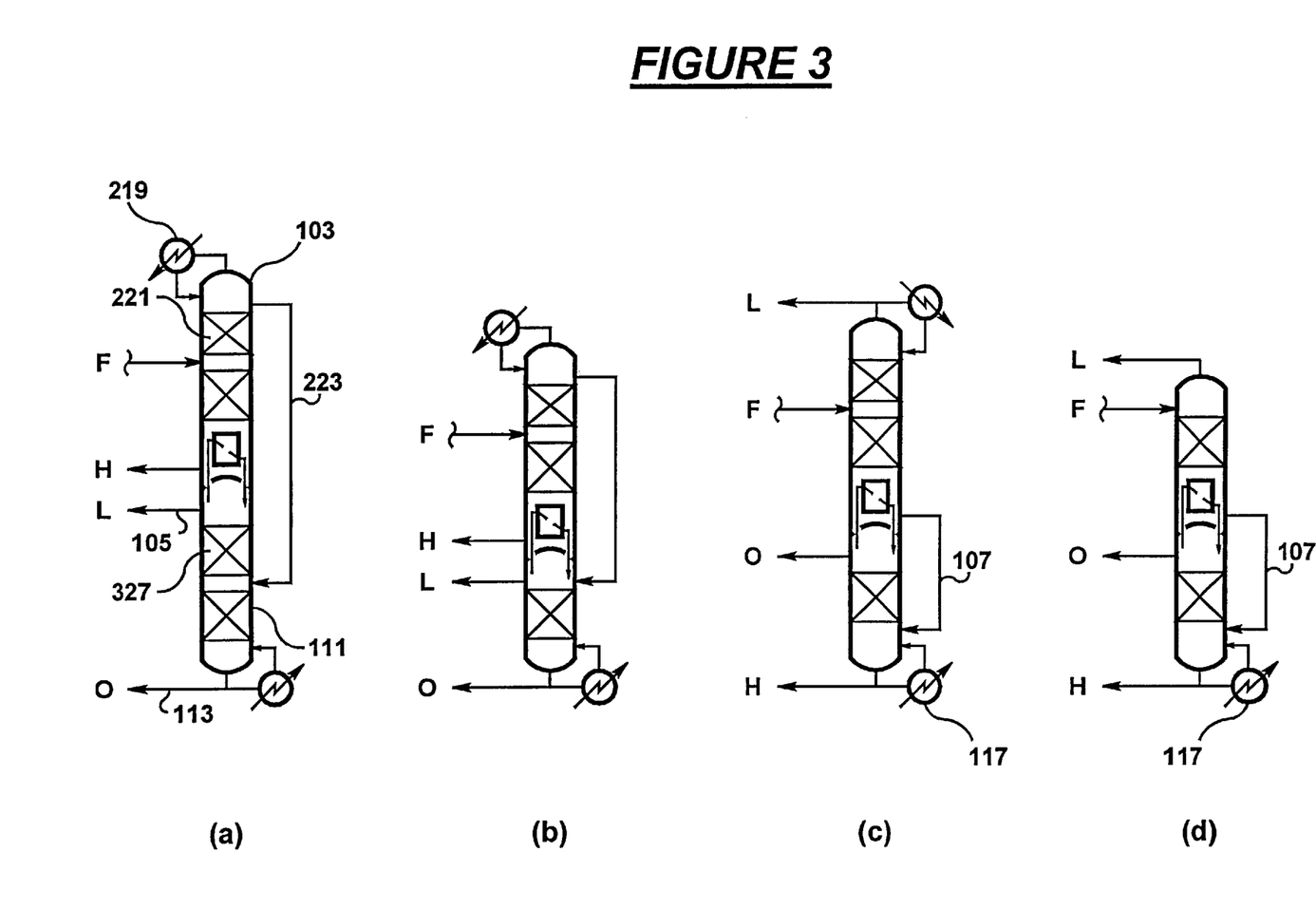
FIGS. 3(a) through 3(d) are schematic diagrams of four other embodiments of the present invention.

The embodiment illustrated in FIG. 1 is but one of many possible embodiments of the invention. Additional examples are illustrated in FIGS. 2 and 3, which are discussed below. For simplicity, the streams have been abbreviated as follows: F is the feed to the process, O is the desired oxygen product substantially free of light impurities and heavy impurities, L is a waste stream enriched in a light impurity, and H is a waste stream enriched in a heavy impurity.

FIG. 2 shows some variations of the embodiment in FIG. 1. FIG. 2(a) represents the embodiment illustrated in FIG. 1. Streams F, O, L, and H in FIG. 2(a) correspond to streams 101, 113, 105, and 115, respectively, in FIG. 1.

In FIG. 2(b), a condenser 219 has been added to the top of the lower pressure column 103. This may be advantageous when the feed 101 to the process is a vapor. This condenser may be driven by warming or vaporizing any suitable stream. Examples include, but are not limited to, liquid nitrogen or a portion of the liquid oxygen feed.

In FIG. 2(c), in addition to the condenser 219, a distillation section 221 has been added to the lower pressure column 103 above the feed point. This configuration is useful when it is desirable to reduce the flow of waste stream L (105) and thereby reduce the loss of oxygen feed.

In FIG. 2(d), in addition to the condenser 219, the feed is placed in the bottom of the lower pressure column 103. Furthermore, a substantially heavy-free stream 223 is withdrawn from the top of the lower pressure column and introduced to the higher pressure column 111 as a feed. In this case, the desired oxygen product O is withdrawn in stream 113 from the bottom of the higher pressure column, and the waste stream L (105) enriched in lights is withdrawn from the top of the higher pressure column.

FIG. 3(a) is similar to FIG. 2(c) in that the lower pressure column 103 has a condenser 219 plus a distillation section 221 above the feed point. In this embodiment, a substantially heavy-free stream 223 is withdrawn from the top of the lower pressure column and introduced to the higher pressure column 111 as a feed. The desired oxygen product O is withdrawn in stream 113 from the bottom of the higher pressure column and the waste stream L (105) enriched in lights is withdrawn from the top of the higher pressure column.

FIG. 3(b) is similar to FIG. 3(a) except that a distillation section 327 above the feed point to the higher pressure column 111 in FIG. 3(a) has been removed in FIG. 3(b).

FIG. 3(c) is similar to FIG. 2(c) except that a distillation section 229 below the feed point to the higher pressure column 111 in FIG. 2(c) has been removed in FIG. 3(c). The reboiler 117 at the bottom of the higher pressure column is optional if the feed 107 to the higher pressure column is vapor.

FIG. 3(d) is similar to FIG. 2(a) except that the distillation section 229 below the feed point to the higher pressure column 111 in FIG. 2(a) has been removed in FIG. 3(d). The reboiler 117 at the bottom of the higher pressure column is optional if the feed 107 to the higher pressure column is vapor.

Figure 4:
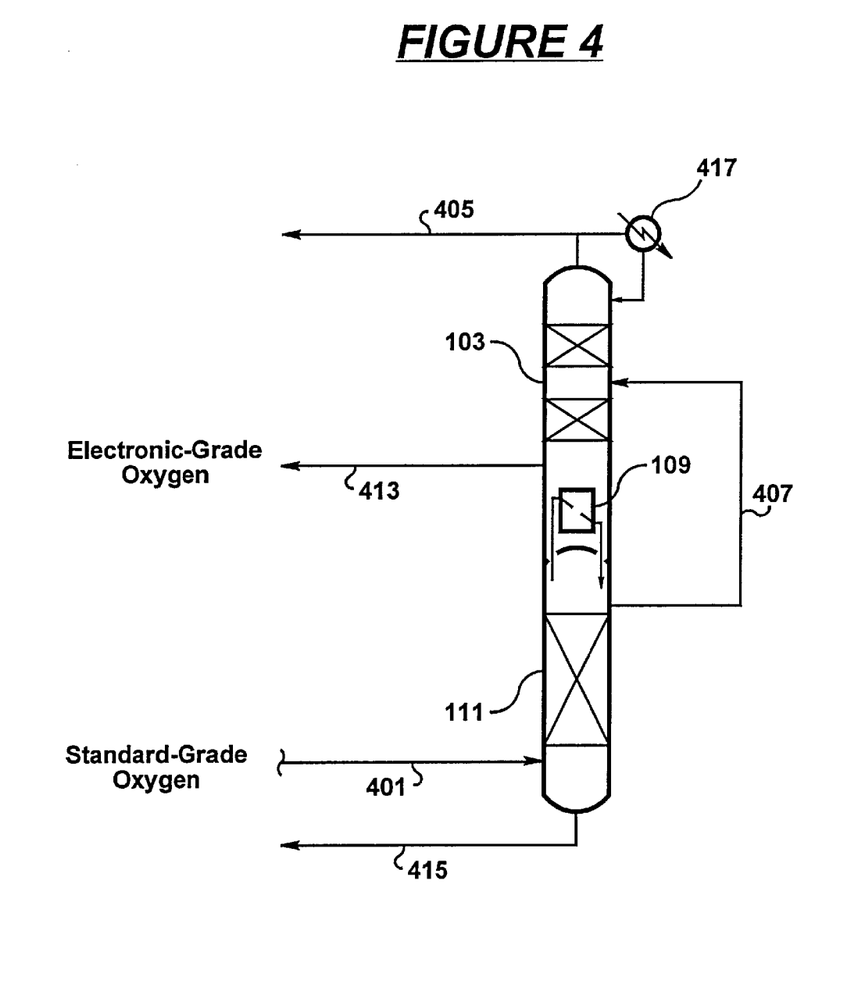
FIG. 4 is a schematic diagram of another embodiment of the present invention.

Another embodiment of the present invention is shown in FIG. 4. Standard-grade liquid oxygen, having been suitably elevated in pressure, is introduced to the bottom of the higher pressure column 111 as vapor stream 401. Higher pressure column 111 produces a stream 415 enriched in a heavy component and a stream 407 substantially free of the heavy component. Reflux for the higher pressure column is provided by reboiler-condenser 109. Stream 407 is eventually fed to the lower pressure column 103 as a feed. Lower pressure column 103 produces a stream 405 enriched in a light component and a stream 413 substantially free of the light component, which stream constitutes the electronic-grade oxygen. Boilup for the lower pressure column is provided by reboiler-condenser 109; reflux for the lower pressure column is provided by heat exchanger 417. The heat removed to provide the reflux for the higher pressure column is thermally linked to the heat added to provide boilup in the lower pressure column through reboiler-condenser 109. Refrigeration for heat exchanger 417 may be provided by warming or vaporizing any suitable stream. Examples include, but are not limited to, liquid nitrogen or a portion of the liquid oxygen feed.

Stream 407 must be decreased in pressure as it is transferred from the higher pressure column 111 to the lower pressure column 103. If stream 407 is withdrawn from the lower pressure column as a vapor, it will flow freely to the lower pressure column. If stream 407 is withdrawn as a liquid, it may need to be pumped to overcome the static head if the lower pressure column is located above the higher pressure column.

The embodiment shown in FIG. 4 may be preferred over the embodiment in FIG. 1 if the source of the standard-grade oxygen is vapor. For example, the source of oxygen feed may be an existing oxygen-producing facility.

Figure 5:
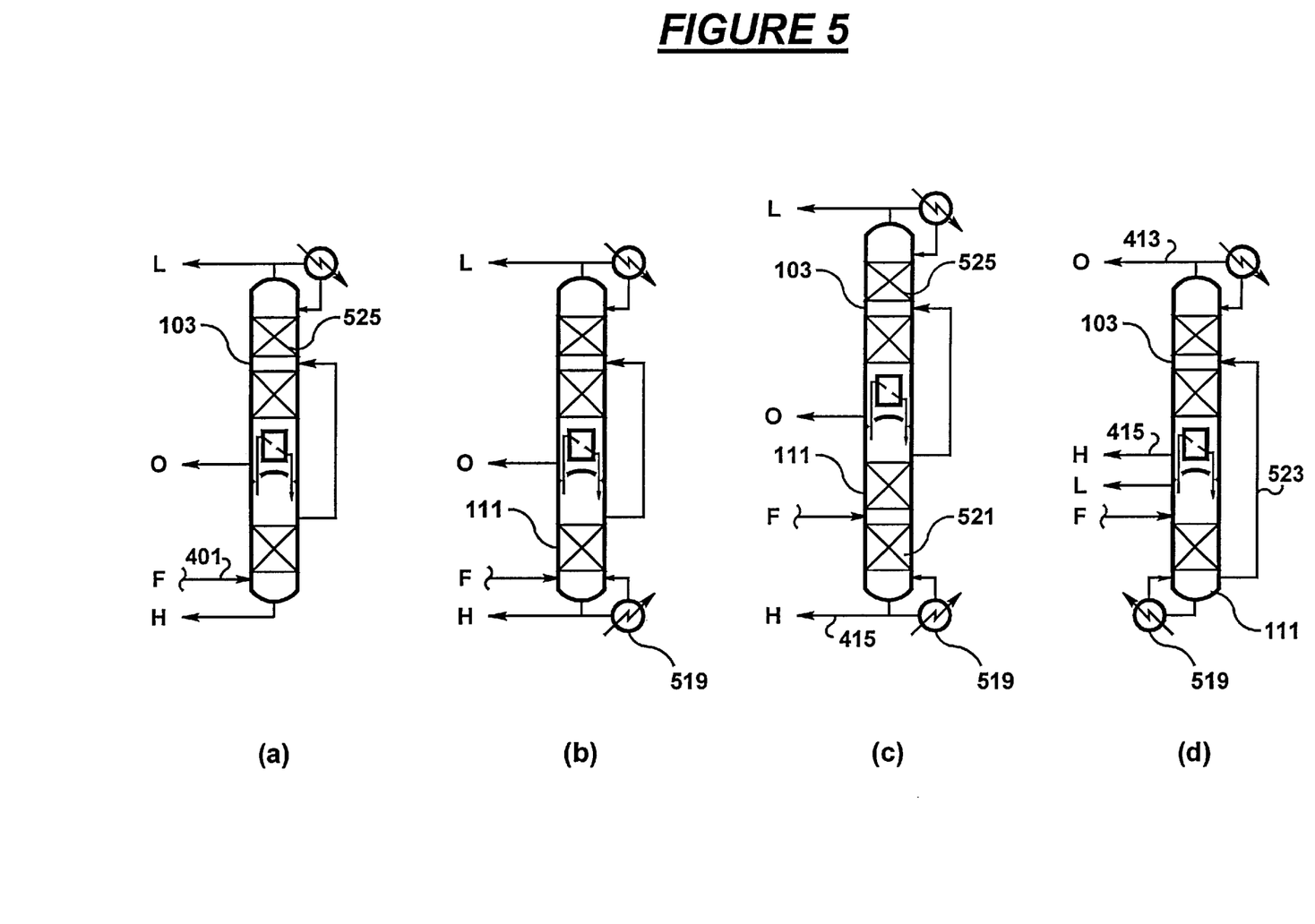
FIGS. 5(a) through 5(d) are schematic diagrams of four other embodiments of the present invention.
Figure 6:
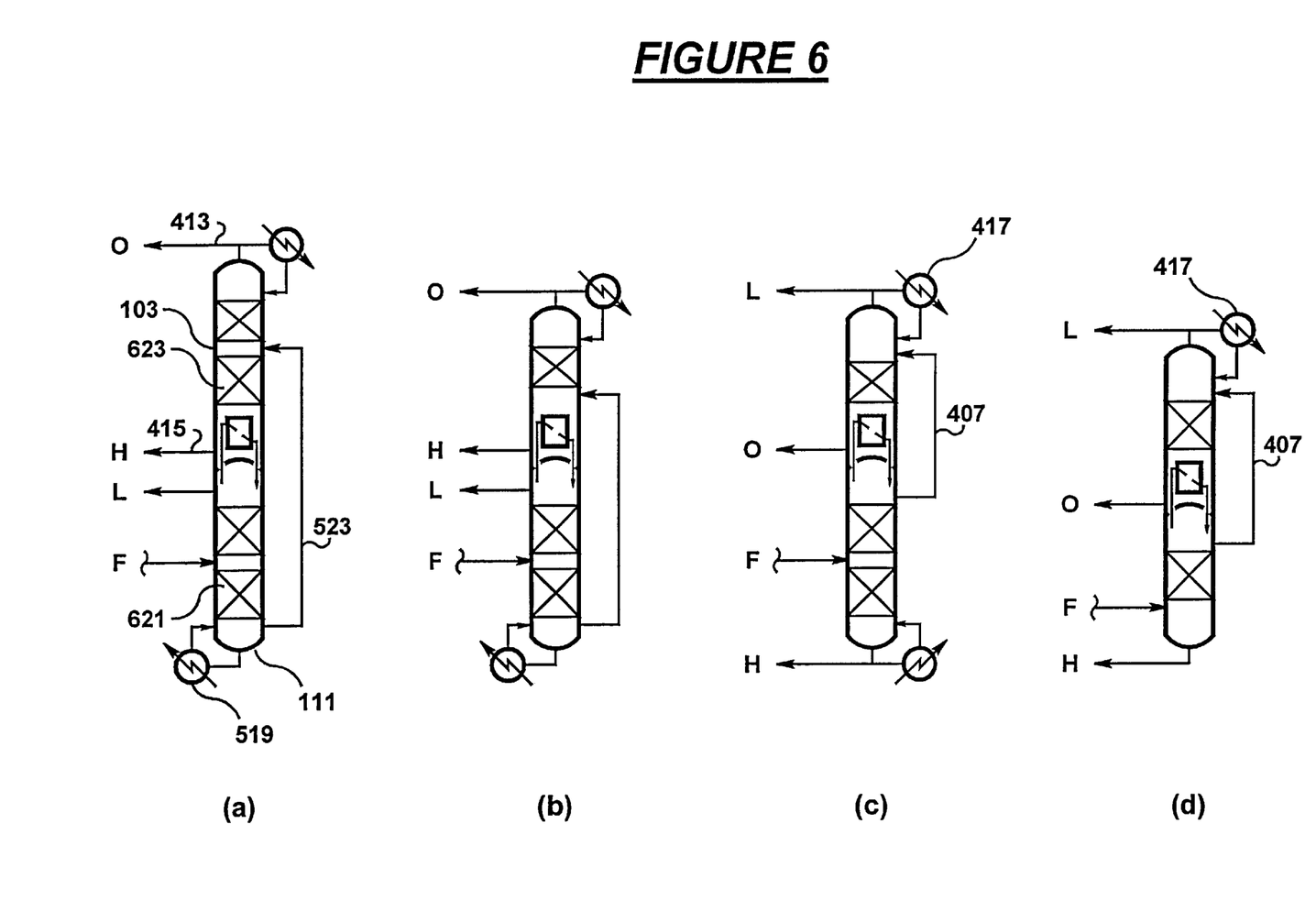
FIGS. 6(a) through 6(d) are schematic diagrams of four other embodiments of the present invention.

As with the embodiment in FIG. 1, the embodiment illustrated in FIG. 4 is but one of many possible embodiments of the invention. Additional embodiments are illustrated in FIGS. 5 and 6 and are discussed below. The same abbreviations used in FIGS. 2 and 3 apply in FIGS. 5 and 6: F is the feed to the process, O is the desired oxygen product substantially free of light impurities and heavy impurities, L is a waste stream enriched in a light impurity, and H is a waste stream enriched in a heavy impurity.

FIG. 5 shows some variations of the embodiment in FIG. 4. FIG. 5(a) represents the embodiment illustrated in FIG. 4. Streams F, O, L, and H in FIG. 5(a) correspond to streams 401, 413, 405, and 415, respectively, in FIG. 4.

In FIG. 5(b), a reboiler 519 has been added to the bottom of the higher pressure column 111. This may be advantageous when the feed to the process is a liquid.

In FIG. 5(c), in addition to the addition of reboiler 519, a distillation section 521 has been added to the higher pressure column 111 below the feed point. This configuration is useful when it is desirable to reduce the flow of waste stream H (415).

In FIG. 5(d), in addition to the addition of reboiler 519, the feed to the process has been moved from the bottom to the top of the higher pressure column 111. Furthermore, a substantially light-free stream 523 is withdrawn from the bottom of the higher pressure column 111 and is introduced to the lower pressure column 103 as a feed. In this case, the desired oxygen product O is withdrawn in stream 413 from the top of the lower pressure column, and the waste stream H (415) enriched in heavy impurities is withdrawn from the bottom of the lower pressure column.

FIG. 6(a) is similar to FIG. 5(c) in that the higher pressure column 111 has a reboiler 519 plus a distillation section 621 below the feed point. In this embodiment, a substantially light-free stream 523 is withdrawn from the bottom of the higher pressure column 111 and introduced to the lower pressure column 103 as a feed. The desired oxygen product O is withdrawn in stream 413 from the top of the lower pressure column, and the waste stream H (415) enriched in heavy impurities is withdrawn from the bottom of the lower pressure column.

The embodiment in FIG. 6(b) is similar to the embodiment in FIG. 6(a) except that a distillation section 623 below the feed point to the lower pressure column 103 in FIG. 6(a) has been removed in FIG. 6(b).

The embodiment in FIG. 6(c) is similar to the embodiment in FIG. 5(c) except that the distillation section 525 above the feed point to the lower pressure column 103 in FIG. 5(c) has been removed in FIG. 6(c). The condenser 417 at the top of the lower pressure column is optional if the feed 407 to the lower pressure column is a liquid.

The embodiment in FIG. 6(d) is similar to the embodiment in FIG. 5(a) except that the distillation section 525 above the feed to the lower pressure column 103 in FIG. 5(a) has been removed in FIG. 6(d). The condenser 417 at the top of the lower pressure column is optional if the feed 407 to the lower pressure column is a liquid.

It will be apparent to persons skilled in the art that, depending on the phase of the standard-grade feed (F), the phases of the two waste streams (H, L), the ultimate purity of the electronic-grade product (O), and the particular embodiment selected, it may be warranted or required to add either a supplemental condenser to the higher pressure column 111 or a supplemental reboiler to the lower pressure column 103.

Although the various embodiments of the present invention have been described in the context of electronic-grade oxygen, it should be apparent to persons skilled in the art that the invention is applicable to the removal of light components and heavy components from any multicomponent fluid stream. For example, the present invention could be applied to the purification of standard-grade nitrogen. Furthermore, although in the descriptions of the various embodiments of the invention the light impurity component and the heavy impurity component each are referred to in the singular, it should be apparent that the invention is applicable for multiple light impurities and/or heavy impurities.

EXAMPLE

In order to demonstrate the efficacy of the present invention and to compare the present invention to a more conventional process, the following example is presented. First, a suitable "conventional" process must be defined; a version of the process taught in FIG. 7 of U.S. Pat. No. 5,682,763 is selected for this purpose.

Figure 7:
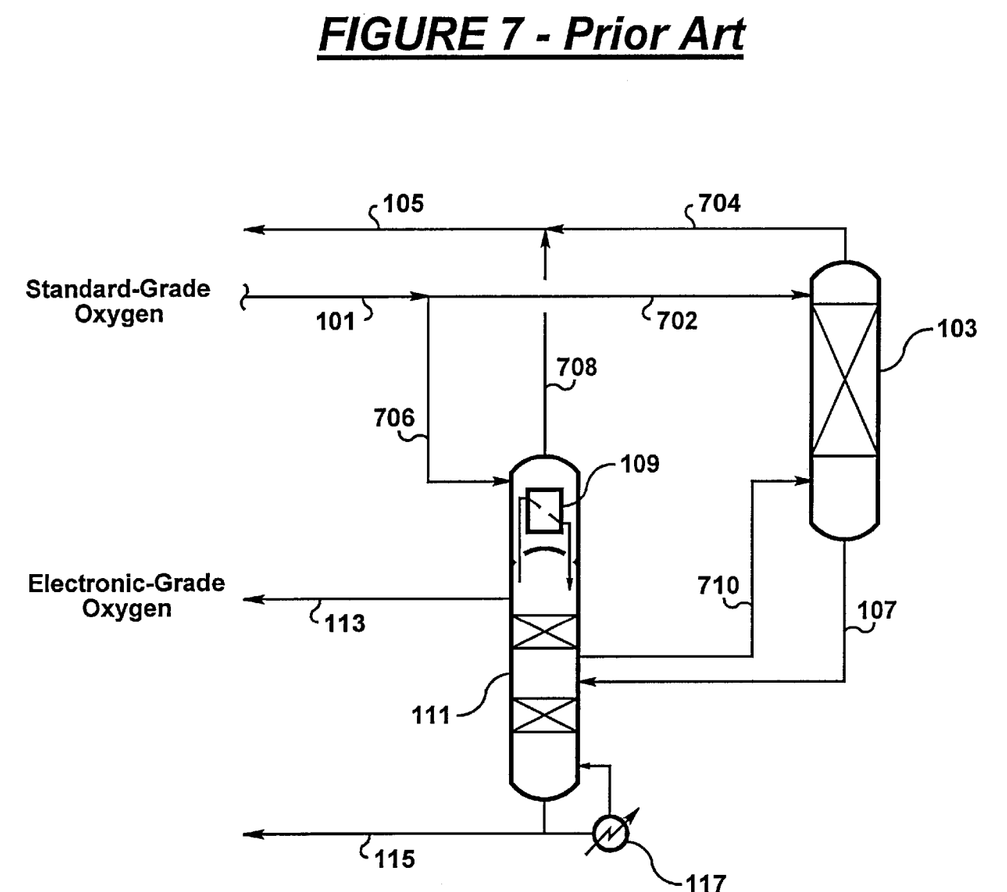
FIG. 7 illustrates a schematic diagram of a prior art process.

FIG. 7 illustrates the application of the prior art teaching to this example. As shown in FIG. 7, the standard-grade liquid oxygen stream 101, having been suitably elevated in pressure, is split into two streams 702 and 706. Stream 702 is introduced to the top of the lower pressure column 103; stream 706 is vaporized to form stream 708 and thereby provide the refrigeration for reboiler-condenser 109. Lower pressure column 103 produces a stream 704 enriched in a light component and a stream 107 substantially free of the light component. Stream 704 is combined with stream 708 to form waste stream 105. Stream 107 eventually is fed to the higher pressure column 111 as a feed. Higher pressure column 111 produces a stream 115 enriched in a heavy component and a stream 113 substantially free of the heavy component, which stream constitutes the electronic-grade oxygen product. Reflux for the higher pressure column is provided by reboiler-condenser 109; boilup for the higher pressure column is provided by heat exchanger 117. A vapor draw 710 is taken from the higher pressure column and directed to the bottom of the lower pressure column to provide vapor flow for the lower pressure column. This type of column configuration is referred to as a side rectifier in U.S. Pat. No. 5,682,763.

In this example, the embodiment of the present invention shown in FIG. 1 can be compared to the prior art teaching illustrated in FIG. 7. The basis of the comparison follows: 1) the feedstock composition is primarily oxygen with 5 ppm nitrogen (light impurity) and 25 ppm methane (heavy impurity); 2) feedstock is available at 18 psia as a saturated liquid; 3) the objective is to produce 10 lb-mole/hr of electronic-grade oxygen as a liquid with impurity levels of 60 ppb nitrogen and 80 ppb methane; 4) heat for heat exchanger 117 is provided by electrical energy. For the flow scheme of FIG. 1, the lower pressure column 103 operates at 18 psia and the higher pressure column 111 operates at 22 psia. For FIG. 7, both the lower pressure column 103 and the higher pressure column 111 operate at nearly the same pressure, 18 psia.

Table 1 below summarizes the key operating parameters:

TABLE 1

| | | Present Invention (FIG. 1) | Prior Art (FIG. 7) |
|---|---|---|---|
| 101 | Feed Flow: lb-mole/hr | 25.0 | 30.8 |
| 105 | Light-enriched Waste: lb-mole/hr | 15.6 | 21.1 |
| 113 | Electronic-grade Oxygen: lb-mole/hr | 9.0 | 9.0 |
| 115 | Heavy-enriched Waste: lb-mole/hr | 0.4 | 0.7 |
| 117 | Heat Input to Heat Exchanger: kW | 13 | 17 |

In this example, the present invention requires about 19% less feedstock and about 24% less heat input than the prior art. The reduction in oxygen feed loss through stream 105 is achieved in the present invention by the thermal linking of the lower pressure column 103 with the higher pressure column 111 through reboiler-condenser 109. Also, as a consequence, the required heat input to heat exchanger 117 is reduced correspondingly.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention.

What is claim is:

1. A process for recovering a purified stream of a first component having a first volatility from a multicomponent fluid containing the first component in a concentration of at least 90 mole %, at least one lighter component having a volatility higher than the first volatility, and at least one heavier component having a volatility lower than the first volatility, said process using a first distillation column operating at a first pressure and a second distillation column operating at a second pressure, wherein the first and second distillation columns are thermally linked and each distillation column has a top, a bottom, and at least one distillation section between the top and the bottom, comprising the steps of:

feeding the multicomponent fluid to the first distillation column;

separating from the multicomponent fluid in the first distillation column substantially all of the at least one lighter component or substantially all of the at least one heavier component, thereby forming a mixture stream substantially free of the at least one lighter component or substantially free of the at least one heavier component;

withdrawing the mixture stream from the first distillation column;

feeding the mixture stream into the second distillation column;

removing from the second distillation column a first stream substantially pure in the first component;

removing from the second distillation column a second stream enriched in the at least one lighter component or in the at least one heavier component; and removing from the first distillation column a third stream enriched in the at least one lighter component or in the at least one heavier component, wherein the first volatility is between the volatility of the at least one component enriching the second stream and the volatility of the at least one component enriching the third stream.

2. A process as in claim 1 wherein the first pressure is higher than the second pressure, and the first and second distillation columns are thermally linked by condensing at least a portion of a vapor stream from the top of the first distillation column by indirect heat exchange against at least a portion of a liquid in the bottom of the second distillation column.

3. A process as in claim 1 wherein the first pressure is lower than the second pressure, and the first and second distillation columns are thermally linked by condensing at least a portion of a vapor stream from the top of the second distillation column by indirect heat exchange against at least a portion of a liquid from in the bottom of the first distillation column.

4. A process as in claim 1 wherein the first component is oxygen.

5. A process as in claim 1 wherein the at least one lighter component is selected from the group consisting of nitrogen, carbon monoxide, helium, hydrogen and argon.

6. A process as in claim 1 wherein the at least one heavier component is selected from the group consisting of carbon dioxide, nitrogen oxides, and hydrocarbons, said hydrocarbons being selected from the group consisting of methane, ethane, ethylene, propane, and propylene.

7. A process for producing an electronic-grade oxygen from standard-grade oxygen containing at least one light impurity and at least one heavy impurity, said process using a first distillation column and a second distillation column, wherein the first and second distillation columns each have a top and a bottom and are thermally linked by condensing at least a portion of a vapor stream from the top of the first distillation column by indirect heat exchange against at least a portion of a liquid in the bottom of the first distillation column, comprising the steps of:

feeding a stream of the standard-grade oxygen to the first distillation column, said first distillation column operating at a first pressure;

separating from the stream of standard-grade oxygen in the first distillation column substantially all of the at least one light impurity, thereby forming a mixture stream substantially free of the at least one light impurity;

withdrawing the mixture stream from the first distillation column;

feeding the mixture stream into the second distillation column, said second distillation column operating at a second pressure higher than the first pressure;

removing from the second distillation column a first stream containing the electronic-grade oxygen;

removing from the second distillation column a second stream enriched in the at least one heavy impurity; and removing from the first distillation column a third stream enriched in the at least one light impurity.

8. A process for producing an electronic-grade oxygen from standard-grade oxygen containing at least one light impurity and at least one heavy impurity, said process using a first distillation column and a second distillation column, wherein the first and second distillation columns each have a top and a bottom and are thermally linked by condensing at least a portion of a vapor stream from the top of the second distillation column by indirect heat exchange against at least a portion of a liquid in the bottom of the first distillation column, comprising the steps of:

feeding a stream of the standard-grade oxygen into the first distillation column, said first distillation column operating at a first pressure;

separating from the stream of standard-grade oxygen in the first distillation column substantially all of the at least one heavy impurity, thereby forming a mixture stream substantially free of the at least one heavy impurity;

withdrawing the mixture stream from the first distillation column;

feeding the mixture stream into the second distillation column, said second distillation column operating at a second pressure lower than the first pressure;

removing from the second distillation column a first stream containing the electronic-grade purity oxygen;

removing from the second distillation column a second stream enriched in the at least one light impurity; and removing from the first distillation column a third stream enriched in the at least one heavy impurity.

9. A process for producing an electronic-grade oxygen from standard-grade oxygen containing at least one light impurity or at least one heavy impurity, said process using a first distillation column and a second distillation column, wherein the first and second distillation columns each have a top and a bottom and are thermally linked by condensing at least a portion of a vapor stream from the top of the first distillation column by indirect heat exchange against at least a portion of a liquid in the bottom of the first distillation column, comprising the steps of:

feeding a stream of the standard-grade oxygen to the first distillation column, said first distillation column operating at a first pressure;

separating from the stream of standard-grade oxygen in the first distillation column substantially all of the at least one light impurity, thereby forming a mixture stream substantially free of the at least one light impurity;

withdrawing the mixture stream from the first distillation column;

feeding the mixture stream into the second distillation column, said second distillation column operating at a second pressure higher than the first pressure;

removing from the second distillation column a first stream containing the electronic-grade oxygen;

removing from the second distillation column a second stream enriched in the at least one heavy impurity; and removing from the first distillation column a third stream enriched in the at least one light impurity.

10. A process for producing an electronic-grade oxygen from standard-grade oxygen containing at least one light impurity or at least one heavy impurity, said process using a first distillation column and a second distillation column, wherein the first and second distillation columns each have a top and a bottom and are thermally linked by condensing at least a portion of a vapor stream from the top of the second distillation column by indirect heat exchange against at least a portion of a liquid in the bottom of the first distillation column, comprising the steps of:

feeding a stream of the standard-grade oxygen into the first distillation column, said first distillation column operating at a first pressure;

separating from the stream of standard-grade oxygen in the first distillation column substantially all of the at least one heavy impurity, thereby forming a mixture stream substantially free of the at least one heavy impurity;

withdrawing the mixture stream from the first distillation column;

feeding the mixture stream into the second distillation column, said second distillation column operating at a second pressure lower than the first pressure;

removing from the second distillation column a first stream containing the electronic-grade purity oxygen;

removing from the second distillation column a second stream enriched in the at least one light impurity; and removing from the first distillation column a third stream enriched in the at least one heavy impurity.

\* \* \* \* \*